United States Patent [19]
Mallonen

[11] 3,863,186
[45] Jan. 28, 1975

[54] THREE PHASE REMOTE CONTROL CIRCUIT BREAKER

[75] Inventor: Edward A. Mallonen, New Berlin, Wis.

[73] Assignee: Cutler-Hammer, Inc., Milwaukee, Wis.

[22] Filed: Oct. 26, 1973

[21] Appl. No.: 409,785

[52] U.S. Cl. .................................... 337/99, 335/44
[51] Int. Cl. .......................................... H01h 71/22
[58] Field of Search ........... 337/99, 378, 70, 78, 38, 337/39, 40, 41, 42, 45, 46, 48; 335/44

[56]  References Cited
UNITED STATES PATENTS

| | | | |
|---|---|---|---|
| 2,906,839 | 9/1959 | Ashe et al. | 337/99 |
| 3,165,609 | 1/1965 | Norden | 335/44 |
| 3,178,535 | 4/1965 | Gelzheiser | 335/44 |

*Primary Examiner*—Harold Broome
*Attorney, Agent, or Firm*—H. R. Rather; W. A. Autio

[57] ABSTRACT

A three phase electromagnetically operated circuit breaker for use in a remote control circuit breaker system is disclosed. It features unitary enclosure and mounting of the stationary and movable contact mechanisms, the electromagnetic operating mechanism, the thermally responsive contact trip release mechanism, and the electronic control for the circuit breaker system. The contact trip mechanism is responsive to overload currents in one or more of the phase branches and features novel differential action ambient temperature compensation afforded by ambient temperature responsive bimetal members individual to each of the three phases.

2 Claims, 7 Drawing Figures

Patented Jan. 28, 1975  3,863,186

Patented Jan. 28, 1975

Patented Jan. 28, 1975 3,863,186

THREE PHASE REMOTE CONTROL CIRCUIT BREAKER

BACKGROUND OF THE INVENTION

U.S. Pat. Nos. 3,706,100 and 3,706,916 describe and claim a main circuit breaker and control system for a type of remote control circuit breaker that is now coming into increasing use on very large jet aircraft. The main circuit breakers of these patents, and other presently available comparable circuit breaker, are capable of closing, opening and interrupting under overload conditions one branch only of the usual three phase, 400 Hz AC power supply systems found on such aircraft. Thus three such main circuit breakers with individual current responsive trip mechanisms must be used in a three phase load circuit to provide complete control. It would be advantageous to provide a main circuit breaker in a unitary configuration which is capable of simultaneously closing and opening all branches of three phase load circuits found on jet aircraft. Moreover, it is desirable to have a common trip mechanism responsive to overload currents in one or more phases of the load circuit to effect automatic opening of such a circuit breaker.

OBJECTS OF THE INVENTION

It is a primary object of the invention to provide an improved form of main circuit breakers for use in a remote control circuit breaker system which is capable of closing and opening a plurality of phase branches in a multiphase AC load circuit.

Another object is to provide a circuit breaker of the aforementioned type wherein a single electromagnetic operator is energizable to simultaneously close and reopen the main contacts in all phases commutated by the circuit breaker.

Still another object is to provide a circuit breaker of the aforementioned type with a single contact trip release mechanism that is responsive to overload conditions in one or more of the load circuit phases.

A further more specific object is to provide an improved ambient temperature compensation mechanism for the aforementioned contact trip release mechanism which is characterized by affording trip release within substantially equal time periods whether overload conditions exist in one or all of the load circuit phase branches.

BRIEF DESCRIPTION OF THE DRAWING FIGURES

DESCRIPTION OF THE PREFERRED EMBODIMENT

Figure 1:
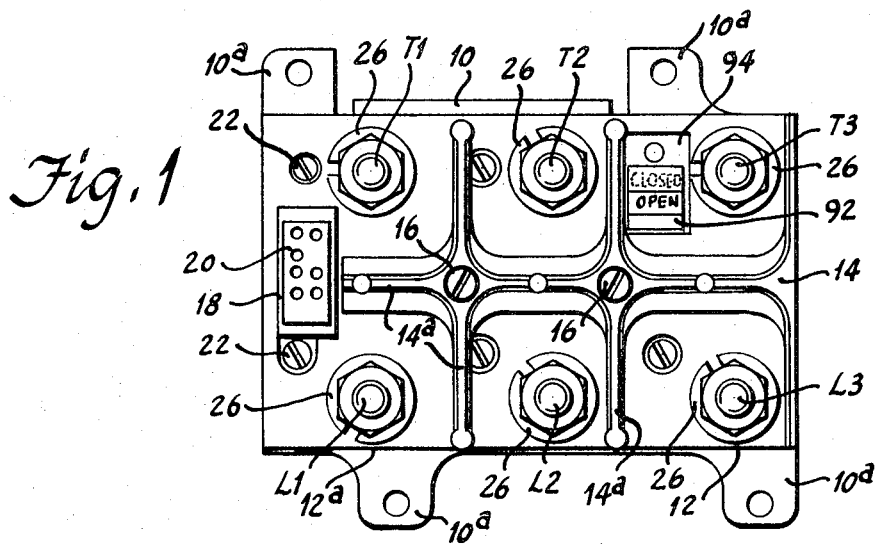
FIG. 1 is a top plan view of a circuit breaker constructed in accordance with the invention.

Referring to the drawings the main breaker unit comprises a metal base 10, preferrably formed from a sheet aluminum stamping, a molded insulating case 12, and an insulating terminal barrier member 14. Base 10 is provided with mounting flanges $10^a$ which have clearance openings therein to receive mounting screws or bolts. Case 12 is provided with a removable front cover $12^a$ which is secured in place by screws that take down into threaded inserts $12^b$ which are molded in place, a rear cover $12^c$ covering the upper half of the rear side of case 12 is also secured in place by screws (not shown) that take down into a pair of inserts (not shown) like the inserts $12^b$. Case 12 is secured in place on base 10 by an epoxy cement and screws (not shown) that penetrate openings in the base and take down into threaded openings in the bottom wall of case.

Figure 2:
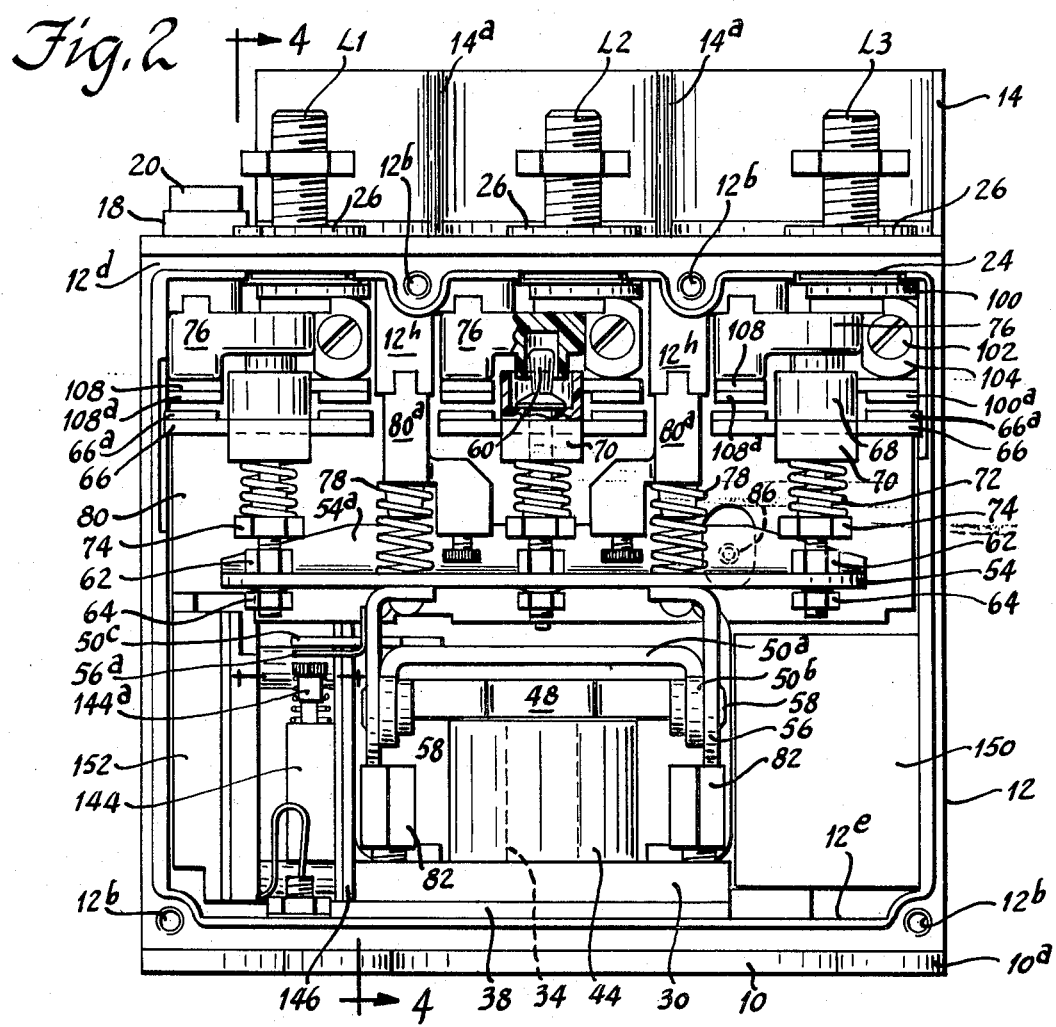
FIG. 2 is a view in front elevation to somewhat larger scale of the circuit breaker of FIG. 1 showing it with a front cover removed.
Figure 4:
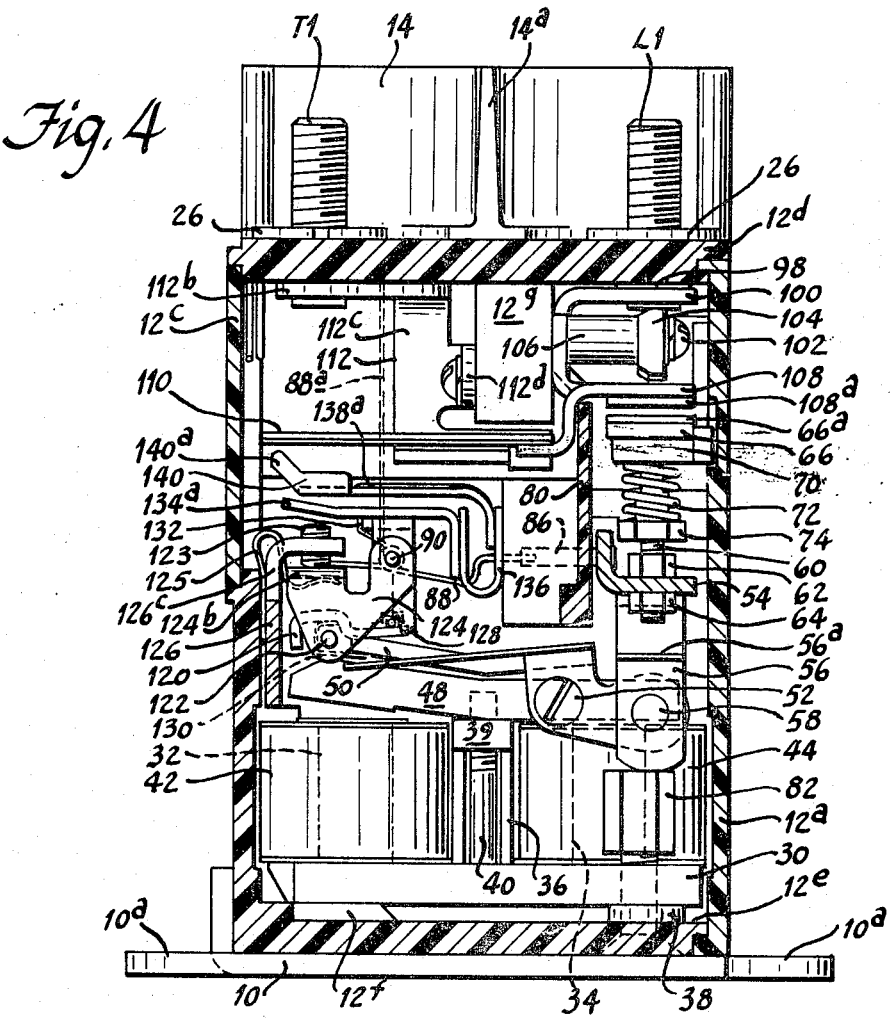
FIG. 4 is a sectional view taken along the line 4—4 of FIG. 2.
Figure 5:
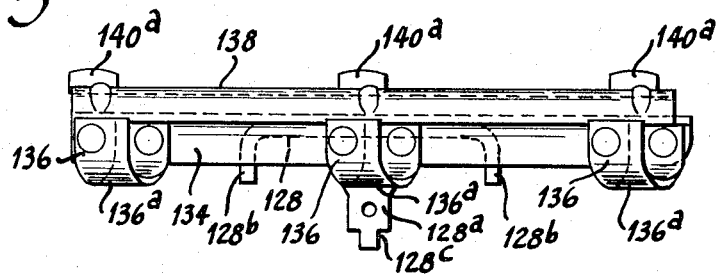
FIG. 5 is an end view of a portion of a latch trip mechanism used in the circuit breaker.

As best shown in FIG. 1, 2 and 4, six threaded terminals L1, L2, L3 and T1, T2 and T3 extend through the upper surface of the top end wall $12^d$ of case 12 and are electrically isolated from each other by the walls $14^c$ of barrier 14. Barrier member 14 is secured to the end wall $12^d$ by screws 16 which penetrate clearance openings in one of the walls $14^a$ and take down into threaded inserts in end wall $12^d$. A generally rectangular insulating terminal block 18 extends through a clearance opening in the upper end wall $12^d$. Block 18 has a rubber sealing grommet 20 which is adapted to grip wires which penetrate the same with pin type terminations. While not shown, block 18 may be assumed to have terminal receptacles which grip the wire pin terminals, a preferred form for the same being shown in the U.S. Pat. No. 3,110,093. Block 18 is secured in place by screws 22 which seal within recesses in the upper surface of end wall $12^d$ and penetrate through the latter and take down into a mounting plate including the inner surface of wall $12^d$.

The threaded terminal members L1 to L3 and T1 and T3 extend through clearance openings in end wall $12^d$ and penetrate washers 24 and take down into threaded openings in terminal members which will hereinafter be described. Annual nuts 26 take down on these terminal members in recesses found in the upper surface of end wall $12^d$.

Figure 6:
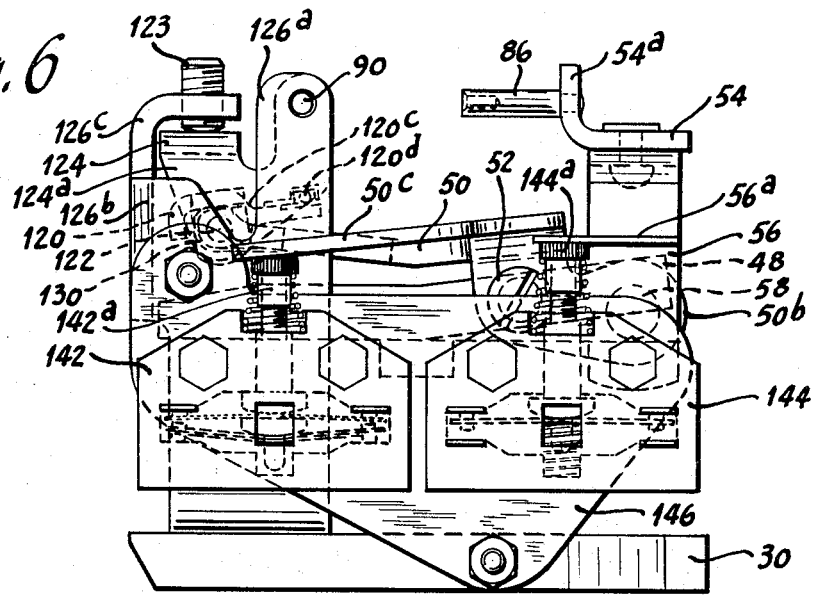
FIG. 6 is a side view of a portion of the latch trip mechanism and auxiliary switch used in the circuit breaker.

An electromagnetic operating mechanism, best shown in FIGS. 2, 4 and 6 is mounted within case 12 against the inner surface of the bottom end wall $12^e$. The operating mechanism has a magnet frame comprising a bottom plate 30 formed of an electromagnet iron, coil core members 32 and 34, preferably formed of a vanadium permendur metal and control permanent magnets 36 formed of an Alnico V metal. As best shown in FIG. 4, plate 30 on its bottom surface seats at the left hand side to a raised boss portion $12^f$ of case end wall $12^e$ and at its right hand side on an insulating spacer 38. Plate 30 is secured in place by screws (not shown) that seat within recesses in the bottom surface of end wall 12e of the case, penetrate openings in such end wall and take into threaded openings in the plate. The cores 32 and 34 are press fitted into openings in plate 30.

The permanent magnet members 36 as best shown in FIG. 4 are clamped in a perpendicular relation to the upper surface of plate 30 by a rectangular member 39 formed of magnet iron. Member 39 is clamped down against the upper ends of the magnets 36 by a pair of elongated screws 40 which penetrate openings through plate 30 and take into threaded openings adjacent the ends of member 39.

Coil assemblies 42 and 44 are mounted about the cores 32 and 34. Although not shown it may be assumed that each of the coil assemblies comprises concentrically wound pairs of coils in the manner and for the purpose shown and described in the aforementioned Pat. No. 3,706,100. An armature 48 having a shallow V-shaped form in longitudinal section as viewed in FIG. 4 seats and is pivotally movable on the upper surface of member 39. Clearance openings are formed through armature 48 in registration with extended portions of the screws 40 which serve to constrain armature 48 against any appreciable lateral or longitudinal movement on member 38.

As best shown in FIGS. 2 and 4, a lever 50 straddles armature 48 with a central web portion 50a overlying the latter and downwardly turned ears $50^a$ and $50^b$ abutting opposite sides of the armature. Lever 50 is pivotally mounted to armature 48 on pivot screws 52 that penetrate clearance openings in the ears $50^a$ and take into threaded recesses in opposed sides of armature 48. A movable contact support assembly comprising a transverse tie plate 54 and spaced apart right angle downwardly depending brackets 56 is in turn pivotally mounted on the lever 50 by means of pivot pins 58 that penetrate clearance openings in the brackets 56 and ears $50^a$ and $50^b$ of lever 50.

As shown in FIG. 4 three movable contact assemblies are mounted on the tie plate 54 in spaced apart relation. Each such assembly comprises a guide pin 60, secured in place by upper end lower nuts 62 and 64, a contactor 66 having contact tips $66^a$, upper and lower insulator supports 68 and 70 on which contactor 66 is supported, biasing spring 72 and an adjusting nut 74. The upper ends of the guide pins interfit in recesses formed in insulator-spacers 76. A pair of coiled compression springs 78 are disposed at their upper ends are about cylindrical projections formed on bosses $80^a$ integrally formed with a frontwardly projecting from insulating barrier member 80, and are constrained at their lower ends by upstanding centering nibs formed on the plate 54. The springs 78 serve as return springs to bias the movable contact assembly downwardly to disengage contacts 66 from the stationary contacts as will hereinafter be more fully described. As shown in FIG. 4, downward travel of the movabel contact assembly is limited by engagement of the lower ends of the brackets 56 engaging with adjustable nuts 82 secured on the threaded shanks of screws 84 secured in the plate 30 of the electromagnetic operator.

As best shown in FIGS. 2 and 4, a tubular sleeve 86 is secured to the upstanding back portion $54^a$ of the tie plate 54 and projects toward the rear cover $12^c$ of the case. A portion of a generally L-shaped lever 88 fits within the bore of sleeve 86. Lever 88 which is formed of wire is pivoted on a pin 90 by looping it 540° about such pin, and has an integral portion $84^a$ which engages with an indicator member 92, which as shown in FIG. 1, has CLOSED and OPEN indication mounted therein visible through a transparent window 94 secured to the upper surface of end wall $12^d$. When the movable contact assembly is in the contact open position shown in FIG. 2, lever 88 is pivoted clockwise to render the OPEN visible. conversely when the movable contact assembly is in the CLOSED contact position, lever 88 is pivoted counterclockwise to cause indicator 92 to move to the position rendering CLOSED visible through window 94.

As shown in FIG. 4, each of the terminal members extends through a washer 98 and the upper limb of a generally U-shaped stationary contact support member 100. The terminal members L1 to L3 are brazed to the lower surface of the lower limbs of the members 100. Screws 102 penetrating clearance openings in cam-stop blocks 104, spacers 106, and openings in the web interconnecting the upper and lower limbs of the members 100 take into threaded recess formed in the bosses $12^g$ integrally formed with the top end wall $12^d$ of the case 12. The cam-stop blocks 104 afford a wedge brace between the upper and lower limbs of the members 100 to prevent any appreciable flexing or bending of the lower limbs when the movable contacts $66^a$ close against the stationary contacts $100^a$.

Figure 3:
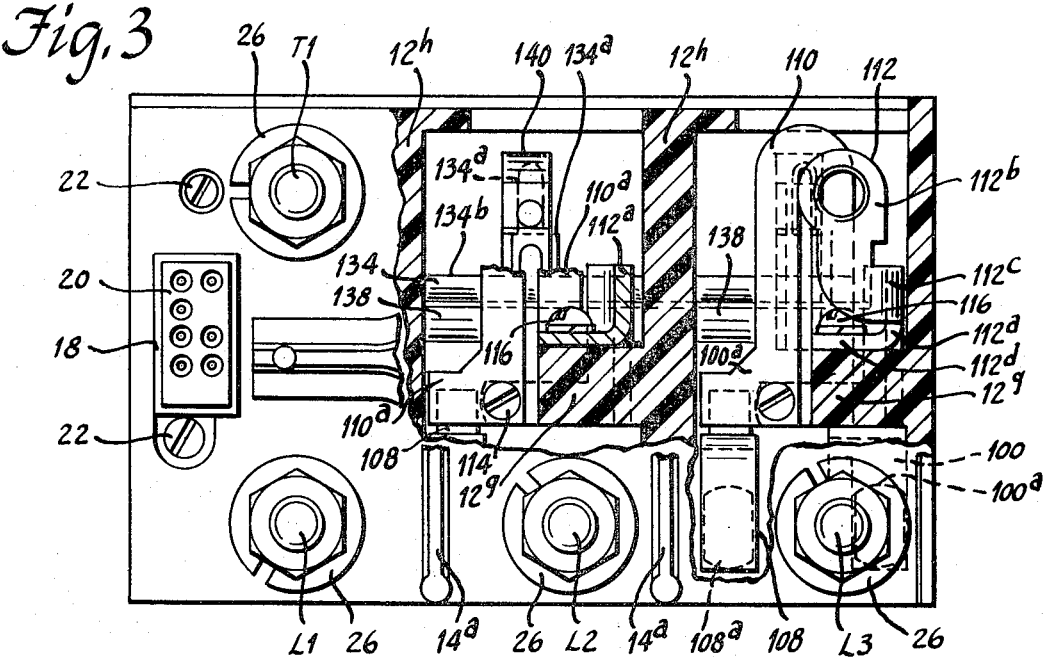
FIG. 3 is a top plan view of the circuit breaker with a barrier member removed, and with portion shown in fragmentary section.

As shown in FIGS. 2 through 4, each of the right hand stationary contacts $102^a$ is associated with a right hand stationary contact $108^a$ are brazed to the upper surfaces of the leftwardly extending tab portions $110^a$ of bimetal members 110 which are generally of a U-shaped configuration as shown in FIg. 3. Adjacent to the tab portions $110^a$, these members are insulatedly supported on the lower limbs $112^a$ terminal members 112 by screws 114, and insulating washers (not shown) disposed about the screws 114 and separating two tabs $110^a$ from contact support members 108. The right hand limbs adjacent their free ends are brazed to the lower limbs $112^a$ of an intermediate terminal member 112.

As best shown in FIGS. 2 and 3, terminal members 112 each have an upper limb $112^b$ through which extends the lower end of an associated one of the terminals T1 to T3 which are secured thereto by riveting over of ends of the latter. Members 112 also have integral portions $112^c$ electrically interconnecting the portions $112^a$ and $112^b$, and bracket portions $112^d$ which abut against the rear side of each of the bosses $12^g$. Screws 116 which penetrate receiving openings in the portions $112^d$ and take into threaded recesses in the bosses $12^g$ afford support and anchoring for each of the terminal members within the case 12.

The aforementioned insulator spacers 76, as best shown in FIG. 4, have a tongue-and-groove interfit with integrally formed barrier portions $12^h$ which depend downwardly from a lower surface of top end wall $12^d$ of case 12. The lower surfaces of the insulator-spacers 76 bear against the upper surfaces of the contact support members 108, and prevent any appreciable flexure or bending of the latter when movable contacts $66^a$ mate with the stationary contacts $108^a$.

Figure 7:
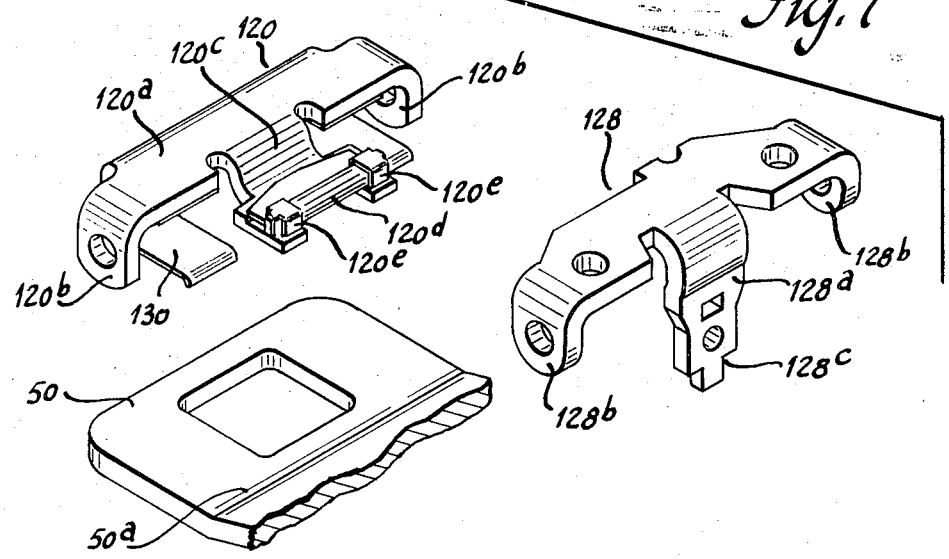
FIG. 7 is an exploded view in perspective of the latch and latch release mechanism of the circuit breaker.

As shown in FIGS. 4, 6 and 7 the latter 50 is normally constrained against any appreciable pivotal movement on armature 48 by a latch bar 120. Latch bar 120 has a main portion $120^a$ which joins downwardly extending ears $120^b$ at opposite ends thereof. Alined openings are provided in the ears $120^a$ to accommodate a pivot pin 122 which is journaled in downward turned pivot flanges $124^a$ of a bracket or yoke 124 that is mounted on the pivot pin 90. Pivot pin 90 is journaled in the spaced apart arms $126^a$ of a frame 126 which is mounted on the plate 30 of the armature assembly.

As best shown in FIG. 7, latch bar 120 has an arm $120^c$ which is bifurcated adjacent its free end. A cylindrical pin 120$^d$ transversely straddles the bifurcated ends of the arm 120$^c$ and is loosely constrained within a formed retainer or cage 120$^e$ so that it can roll therein about its longitudinal axis. A latch arm 128$^a$ of a latch member 128 engages on a shoulder 128$^b$ with the pin 120$^d$, and the arm 120$^c$ on its lower surface bear against the upper surface of the lever 50. A spring 130 formed out of flat spring metal stock has spaced apart lower limbs that bear against the lower surface of lever adjacent the left hand end thereof as viewed in FIG. 4, and an upper limb that bears against the lower surface of the portion 120$^a$ of the latch bar 120.

The latch 128 has spaced depending ears 128$^d$ which are journaled on pivot pin 90 between the aforementioned pivot mounting flanges of the yoke 124. A torsion spring 132 which is anchored at one end of the interconnecting bight portion 124$^b$ of yoke 124 is coiled about pivot pair 90 and is anchored at its other end to latch 128. Latch 128 as viewed in FIG. 4 is biased by spring 132 for clockwise rotation on pin 90 to engage its shoulder 128$^c$ with the pin 120$^d$ on latch bar 120. Latch bar 120 is thus held latched and prevents the left hand end of lever 50 from upward movement.

The yoke 124 is limited against appreciable clockwise pivotal movement by a limit screw 123 that is threaded in a right angle bracket portion 126$^c$ depending from a bight portion 126$^b$ which interconnects the arms 126$^a$ of frame 126. A spring member 125 formed of flat spring metal stock straddles the bight 126$^b$ of frame 126 and has a reversely curved portion 126$^a$ that bears against the lower surface of the bight 124$^b$ to hold the latter in engagement with the end of stop screw 123. As will hereinafter be more fully explained, adjustment of screw 123 determines the point at which latch 120 disengags from latch catch for a given amount of thermal deflection of the center one of the bimetal members 110.

A tie bar 134 is secured to the upper surface of latch 128 and has three spaced apart fingers 134$^a$ depending from a longitudinal portion 134$^b$. Three compensator bimetal members 136 are riveted to bar 134 at corresponding ends in spaced apart relation, and have helically coiled intermediate sections 136$^a$. At their other corresponding ends the members are riveted to a lever 138 which has three spaced apart arms 138$^a$ which overlie the fingers 134$^a$ of the bracket 134. Insulator tabs 140 are riveted on the upper surface of the arms 138$^a$ adjacent the free ends thereof. Each of the tabs 140 has a portion 140$^a$ angling upwardly toward and underlying the lower surface of respective ones of the bimetal members 110. As will hereinafter be more fully explained the tabs 140 are engaged by one or more of the bimetal members 110 under current overload conditions to cause counterclockwise pivoting of lever 138, the bracket 134 and latch 128.

As best shown in FIGS. 2 and 8, two mechanically operated switches 142 and 144 are mounted on a bracket plate 146 which is secured to plate 30 of the electromagnetic operating assembly. Switch 142 has an external operating plunger 142$^a$ which is normally held inwardly by an arm 50$^b$ of lever 50 to open the switch contacts. Switch 144 has an operating plunger 144$^a$ that is engagable on its end with a tab 56$^a$ secured on the left hand bracket 56 as viewed in FIG. 2. Switch 142 is held in contact open portion whenever the left hand end of lever 50 is secured in latched down portion by latch bar 120 and latch 128. This switch serves as the OLT or overload trip switch whose purpose and function is more fully described in copending application Ser. No. 396,733, filed Sept. 13, 1973 and assigned to the assignee of this application. Switch 144 may have a single set or dual set of contacts as desired. One of the sets is closed whenever the main contacts are closed, and the other set of which are closed when the main circuit breaker contacts are open. While not limited thereto the contacts of switch 144 are advantageous for use in electrical indicating circuits to indicate the operating condition of the circuit breaker at a remote location.

Two molded epoxy cases 150 and 152 are mounted in case 12 as best shown in FIG. 2. These cases may be assumed to contain molded in situ, descrete components of the electronic control system shown and described in the aforementioned copending application Ser. No. 396,733. Certain wire leads therefrom connect with the coil pairs 42 and 44 on each of the cores 32 and 34 of the electro-magnetic operator, and contacts of the OLT switch 144. Reference should be made to that application for a complete description how that electronic control responds to operation of a remote pilot circuit breaker to provide corresponding energization of the coils on cores 32 and 34 to close and open the movable contact 66$^a$ to stationary contact pairs 100$^a$ and 102$^a$, and to overload trip open of these main contacts and closing of contacts of switch 142.

The operating position of the circuit breaker as shown in FIGS. 2 and 4 is the contact open position wherein all three sets of movable contacts 66$^a$ are out-of-engagement with their associated pairs of stationary contact 100$^a$ and 108$^a$. It will be observed that the armature 48 is sealed against the core 32 of the electromagnetic operator, and that the tab 56$^a$ is holding the plunger 144$^a$ of switch 144 inward of the switch housing in this position of the breaker all three line terminals L1 and L3 are electrically disconnected from their associated line terminals. The coil pairs of both the electromagnetic operators 42 and 44 may be assumed to be deenergized. Armature 48 is magnetically latched to the core 33 by the influence of the permanent magnet members 36, in the manner described in the aforementioned Pat. No. 3,706,100.

Now let it be assumed that the main operating coil on core 32 is energized. As viewed in FIG. 4, armature 48 will then pivot counterclockwise on the screws 40 and seal against the upper end of core 32. In so pivoting the right hand end of armature 48 moves upwardly and effects corresponding upward movement of the brackets 56, tie bar 54 and the movable contact assemblies mounted on bar 54. consequently the movable contacts 66$^a$ all close into engagement with their respective associated pairs of stationary contacts 100$^a$ and 108$^a$ to thereby complete electrical connections between the line terminals L1 to L3 and the load terminals T1 to T3. The coils associated with core 32 will automatically be deenergized after a timed interval as described in the aforementioned copending application Ser. No. 396,733. Armature 48 will then have its left hand end magnetically latched to the core 32 by the action of permanent magnet members 36 as hereinbefore described.

When it is desired to re-open the contacts at all three poles, the core 34 would than have its main coil of the coil pair energized to cause clockwise pivotal movement of armature 48 on the ends of the posts 40. This results in downward movement of brackets 56 and the bar 54 to effect corresponding downward movement of the movable contact assemblies and disengagement of contacts 66$^a$ from their associated stationary contacts 100$^a$ and 108$^a$.

Let it be assumed that terminals L1 to L3 are connected to respective conductors of a three phase, 208 volt, AC supply, that terminals T1 to T3 are connected to an electrical load, that the movable contacts are closed to their associated stationary contacts and that the left hand end of armature 48 is latched as aforedescribed to the upper end of core 32. Now assume, that an overload condition occurs, and that heavy current is drawn through one or more of the branches.

This current will of course flow through the bimetal member 110 associated with these terminals, and will cause the latter to warp downwardly adjacent its U-shaped end.

In warping downwardly a member 110 will engage the portion 140$^a$ of the tab 140 mounted on the arm 138$^a$ of lever 138. This will cause lever 138, tie bar 134, and latch 128 to pivot counter-clockwise as viewed in FIG. 4. Latch 128 will ultimately be disengaged from the pin 120$^d$ of latch bar 120. Latch bar 120 is then free to correspondingly pivot counterclockwise on pin 120 under the bias of the spring 130.

As latch bar 120 pivots counterclockwise it moves out of engagement with the upper surface of lever 50 adjacent the left hand of the latter. Lever 50 is then freed to pivot clockwise on armature 50, and does so under the bias imparted by the return springs 78 of the movable contact mechanism, and the latter mechanism moves downwardly to open all the main contacts. Lever 50 in so pivoting after release by latch bar 120 releases the pressure entered on plunger 142$^a$ of switch 142 and thus allows the latter switch to close its contacts which perform a function in connection with the electronic control system described in the copending application Ser. No. 396,733. By action of such electronic control system, the main coil of coil pair 44 is energized to return armature 48 to the position depicted in FIG. 4. When armature 48 so moves, lever 50 is correspondingly moved and its left hand end is again engaged on its upper surface by the arm 120$^c$ of the latch bar.

If the bimetal members 110 have cooled sufficiently, they will have moved out of disengagement from the tabs 140$^a$ and consequently the latch shoulder 128$^b$ of the latch can then engage with the pin 120$^d$ of the latch bar under the bias of the torsion spring 132. With the left hand end of lever 50 re-latched, the movable contact operating assembly can again be operated to close and reopen the circuit breaker contacts as hereinbefore described.

The assembly comprising the bar 134, the three compensator bimetal members 136, and the torsion lever 138 provides ambient temperature compensation for the main bimetal members 110. Thus assembly is an important and novel feature of the present invention as it insures approximately the same latch trip time whether one, two or all three phase paths through the main contacts of the circuit breaker are carrying overload currents.

When one phase path only is carrying appreciable overload current ambient heating will be generally confined in the area of the compensated member 138 associated therewith, and any deflecting force tending to move torsion lever 138 counterclockwise (as viewed in FIG. 2) will be resisted by the other two compensating members. The when the main bimetal member 110 of the overload phase engages its associated tab 140 the assembly will have to be mechanically moved a certain distance D to effect disengagement of the shoulder 128$^b$ out of engagement with the pin 120$^d$.

Now assume a condition when all three phase branches are overloaded. The torsion lever 138 will be moved clockwise away from the bimetal members 110 a greater distance as all compensation members 136 are then flexing. Consequently the members 100 will have a greater distance of free air bending before engaging their respective tabs 140, but after engagement therewith, the distance D1 of required movement of the aforementioned assembly to effect latch trip will be decreased approximately to one-third that of the distance D. it will be appreciated that under these conditions that the force exerted by three bimetal members 110 will be approximately three times that exerted by a single such member. Moreover, under two and three phase overload conditions the assembly comprising bar 134, compensation bimetal members 136 and torsion lever 138 will be proportionately stiffer and thus flex less following engagement by the main bimetal members 110.

From the foregoing it will be seen that the total distance of movement of any or all of the bimetal members 110 required to effect latch tripping remains essentially the same for one, two or three phase overload conditions, and that the compensator members 136 and torsion lever, in effect, provide a differential travel mechanism.

As aforementioned the compensator bimetal members 136 have portions 136$^a$ which are of a helically wound form. In other words, these sections 136$^a$ correspond to sections of a helically coiled bimetal member formed of flat stock helically wound about a cylindrical form with a constant pitch angle. It has been found that this form for the sections 136$^a$ permits a 50 percent reduction in the amount of bimetal required to obtain the same degree of angular deflection under heating as compared to the same sections being made in U-shaped form with parallel arms.

Calibration of the trip point for latch 128 is accomplished by subjecting the center pole of the circuit breaker inclusive of terminals L2 and T3 to a predetermined, simulated current, and then adjusting screw 123 so that latch 128 trips free from pin 120$^d$ within a given time interval following initiation of such current flow. To calibrate the trip time of the other poles, they are subjected to the same simulated current and them members mechanically bent at their junction with terminals 108 so that they will effect latch tripping within the same specified time interval.

I claim:

1. In an electro-thermal latch trip mechanism the combination with a pivotally mounted latch having means biasing it towards a latching position
   a. of a plurality of bimetal members connectable in the respective branches of an electrical load circuit
   b. a member having portions in line with respective ones of said bimetal members, and
   c. ambient temperature compensator bimetal members spaced apart and corresponding in number to the first mentioned bimetal members and attached at corresponding ends to said latch and attached to and supporting said member at their other ends d. said first mentioned bimetal members warping toward and engaging with said member in accordance with the overload current flowing therethrough to pivot said latch out of its latching position, and e. said compensator bimetal members individually and differentially tending to warp and pivot said member away from said bimetal members and toward said latach in accordance to the ambient temperature to which they are subjected.

2. The latch trip mechanism according to claim 1 wherein said compensator bimetal members have intermediate portions of helical section in form.

* * * * *